(12) United States Patent
Gupta

(10) Patent No.: US 12,723,565 B2
(45) Date of Patent: Sep. 1, 2026

(54) MASKING TONAL NOISE FROM A WIND TURBINE

(71) Applicant: VESTAS WIND SYSTEMS A/S, Aarhus N (DK)

(72) Inventor: Mranal Gupta, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 343 days.

(21) Appl. No.: 18/260,448

(22) PCT Filed: Dec. 7, 2021

(86) PCT No.: PCT/DK2021/050356
§ 371 (c)(1),
(2) Date: Jul. 5, 2023

(87) PCT Pub. No.: WO2022/148513
PCT Pub. Date: Jul. 14, 2022

(65) Prior Publication Data

US 2024/0011465 A1 Jan. 11, 2024

(30) Foreign Application Priority Data

Jan. 5, 2021 (DK) .......................... PA 2021 00016

(51) Int. Cl.
*F03D 7/02* (2006.01)

(52) U.S. Cl.
CPC ...... *F03D 7/0296* (2013.01); *F05B 2260/962* (2013.01); *F05B 2270/329* (2013.01)

(58) Field of Classification Search
CPC .... F03D 7/0296; F03D 1/0633; F03D 1/0641; F03D 1/0658; F03D 1/0675;
(Continued)

(56) References Cited

U.S. PATENT DOCUMENTS 8,338,978 B2 * 12/2012 Yasugi .................... F03D 9/255 290/44
8,414,261 B2 * 4/2013 Bonnet ................ F03D 1/0641 416/62
(Continued)

FOREIGN PATENT DOCUMENTS

CN 101265878 A 9/2008
CN 104340114 A 2/2015
(Continued)

OTHER PUBLICATIONS

PCT, Notification of Transmittal of The International Search Report and The Written Opinion of The International Searching Authority, or The Declaration for Application PCT/DK2021/050356 dated Feb. 22, 2022.

(Continued)

*Primary Examiner* — Gerald Gauthier
(74) *Attorney, Agent, or Firm* — Patterson + Sheridan, LLP; Gero G. McClellan

(57) ABSTRACT

A method of masking tonal noise from a wind turbine. The wind turbine has a noise generator and a rotor-nacelle-assembly (RNA). The RNA comprises a nacelle and a rotor configured to rotate about a rotor axis with a horizontal projection. The method comprises: feeding a drive signal into the noise generator so that the noise generator emits directional masking noise, wherein the directional masking noise at least partially masks tonal noise from the wind turbine and points in a masking direction with a horizontal projection. The horizontal projection of the masking direction points away from the horizontal projection of the rotor axis.

18 Claims, 12 Drawing Sheets

(58) Field of Classification Search
CPC .......... F03D 7/0236; F03D 7/048; F03D 9/25; F03D 9/255; F03D 15/10; F03D 80/30; F03D 80/60; F05B 2260/962; F05B 2270/329; Y02E 10/72; G10K 11/345; G10K 11/352; G10K 11/1752; G10K 11/752; H02K 7/1838
See application file for complete search history.

(56) References Cited

U.S. PATENT DOCUMENTS 9,784,247 B2 * 10/2017 Eriksen .................. F03D 80/60
9,945,357 B2 * 4/2018 Enevoldsen .......... F03D 1/0675
11,445,294 B2 * 9/2022 Koschak .............. G10K 11/178
2006/0009969 A1 1/2006 L'Esperance et al.
2007/0031237 A1 * 2/2007 Bonnet .................. F03D 7/048 415/1
2008/0164091 A1 7/2008 Kerber
2008/0286110 A1 * 11/2008 Gupta .................. F03D 1/0675 416/241 A
2010/0272285 A1 * 10/2010 Loud ........................ H04K 3/45 381/73.1
2011/0076149 A1 * 3/2011 Santiago ............... F03D 1/0675 416/223 R
2011/0255974 A1 * 10/2011 Nanukuttan .......... F03D 7/0236 416/146 R
2012/0139254 A1 * 6/2012 Attia ..................... F03D 7/0296 290/55
2013/0200618 A1 * 8/2013 Prindle .................... F03D 9/25 290/55
2013/0280073 A1 * 10/2013 Erichsen ................ F03D 80/30 416/146 R
2014/0016790 A1 1/2014 Loud
2014/0294592 A1 * 10/2014 Drack .................. F03D 1/0633 156/60
2015/0043744 A1 2/2015 Lagodzinski et al.
2015/0078913 A1 * 3/2015 Enevoldsen .......... F03D 1/0658 29/889.7
2015/0167631 A1 * 6/2015 Prindle ................ H02K 7/1838 290/55
2016/0032893 A1 2/2016 Herrig et al.
2017/0145990 A1 * 5/2017 Drack .................. F03D 1/0641
2018/0216600 A1 * 8/2018 Zamora Rodriguez ...................... F03D 1/0633
2019/0088247 A1 3/2019 True
2019/0271295 A1 * 9/2019 Gupta ..................... F03D 17/00
2020/0332767 A1 10/2020 Gupta et al.
2020/0400126 A1 * 12/2020 Mtauweg ................ F03D 15/10
2022/0010774 A1 * 1/2022 Asheim ................. F03D 7/0296
2024/0011465 A1 * 1/2024 Gupta .................. F03D 7/0296

FOREIGN PATENT DOCUMENTS

CN 111771052 A 10/2020
DE 102015008812 A1 * 1/2017 ......... G10K 11/1752
DK 201570855 A1 1/2017
DK 201970767 A1 12/2020
EP 3096006 A1 11/2016
JP 2010-216307 A * 9/2010 ............. F03D 11/00
JP 2010216309 A 9/2010
JP 5191423 B2 * 5/2013

OTHER PUBLICATIONS

Danish Patent and Trademark Office, 1st Technical Examination Including The Search Report and Search Opinion for Application PA 2021 00016 dated Jun. 30, 2021.
Office Action received for Chinese Patent Application No. 202180089061.8, mailed on Jan. 24, 2026, 20 pages (10 pages of English Translation and 10 pages of Original Document only).

* cited by examiner

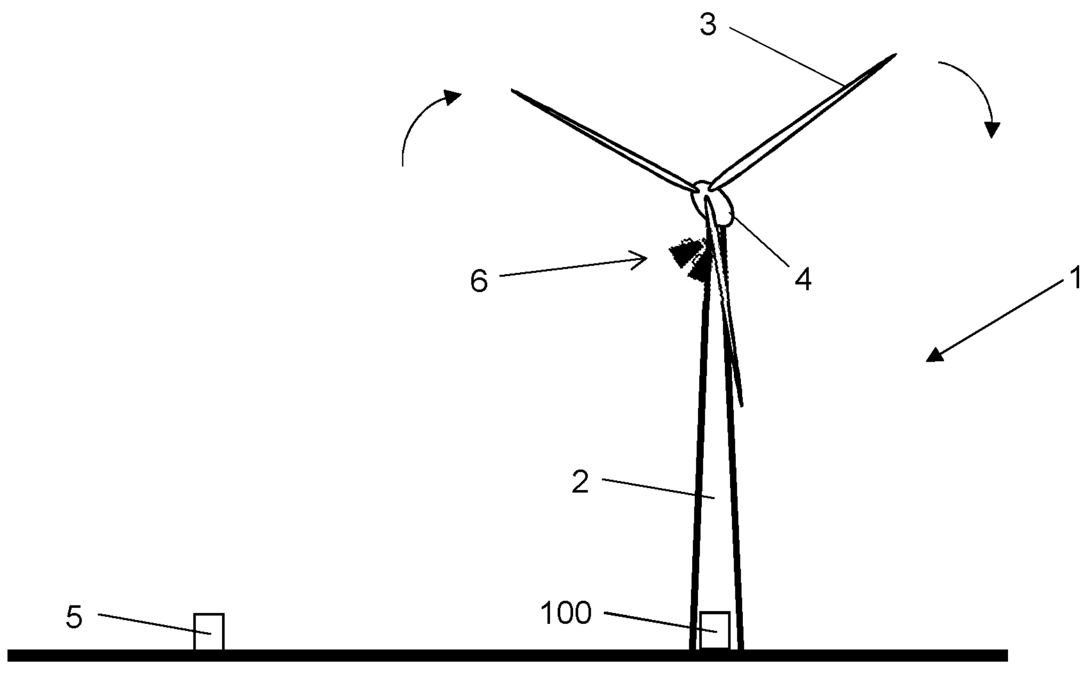
FIG. 1
FIG. 2
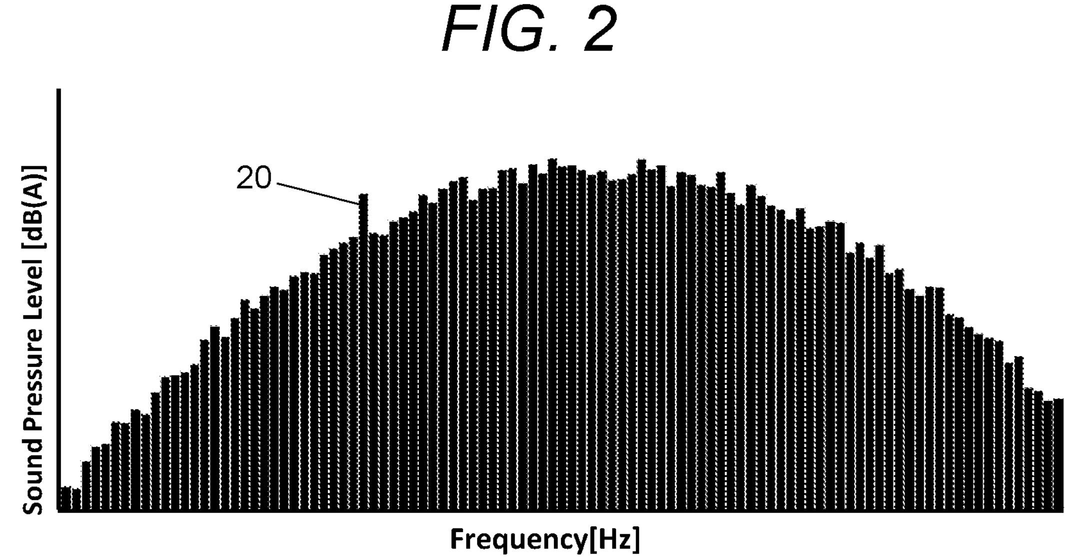

21a
7a
natural masking
additional masking
rotor axis
20a
30
tonal noise
23a 23a
23
30
10
11
17
12
100
16
13
15
14
Upwind
Downstroke
Upstroke
Downwind
23a
30

10
11
17
100
12
16
13
15
14
Downstroke
Upwind
Downwind
Upstroke
23a
30

10
17
16
11
100
15
12
14
13
Downstroke
Upwind
Downwind
Upstroke

MASKING TONAL NOISE FROM A WIND TURBINE

FIELD OF THE INVENTION

The present invention relates to a method, and associated apparatus, for masking tonal noise from a wind turbine.

BACKGROUND OF THE INVENTION

DE 102015 008812 A1 discloses an acoustic emission device for a wind turbine with a rotor-nacelle-assembly (RNA). A loudspeaker is arranged at the rear of the RNA, and radiates sound to the rear, in line with the rotor axis.

SUMMARY OF THE INVENTION

A first aspect of the invention provides a method of masking tonal noise from a wind turbine, the wind turbine comprising a noise generator and a rotor-nacelle-assembly (RNA), the RNA comprising a nacelle and a rotor configured to rotate about a rotor axis with a horizontal projection; the method comprising: feeding a drive signal into the noise generator so that the noise generator emits directional masking noise, wherein the directional masking noise at least partially masks tonal noise from the wind turbine and points in a masking direction with a horizontal projection, and wherein the horizontal projection of the masking direction points away from the horizontal projection of the rotor axis.

The method may further comprise rotating the RNA about a yaw axis to change a yaw angle of the RNA, wherein the masking direction does not change as the yaw angle changes.

The method may further comprise rotating the RNA about a yaw axis to change a yaw angle of the RNA, wherein the masking direction changes as the yaw angle changes.

Optionally the rotor defines an upwind direction, a downwind direction, an upstroke direction and a downstroke direction; and at least a component of the horizontal projection of the masking direction points in the upwind direction or the upstroke direction.

Optionally the horizontal projection of the rotor axis is oriented at an angle relative to the horizontal projection of the masking direction, and the method comprises: changing the angle by rotating the RNA about a yaw axis; and changing the drive signal in accordance with the change of angle, thereby changing a characteristic of the directional masking noise.

Optionally the horizontal projection of the masking direction is at an angle relative to the horizontal projection of the rotor axis; and a characteristic of the directional masking noise is set on the basis of the angle.

Optionally the characteristic of the directional masking noise is a frequency profile or sound power of the directional masking noise.

Optionally changing the drive signal causes a sound power of the directional masking noise to increase; the tonal noise is a directional tonal noise which points in a tonal noise direction with a horizontal projection; and the change of the angle causes the horizontal projection of the masking direction and the horizontal projection of the tonal noise direction to become more closely aligned with each other.

The method may further comprise generating directional natural masking noise, wherein the directional natural masking noise at least partially masks the tonal noise and points in a natural masking noise direction with a horizontal projection, wherein changing the drive signal causes a power of the directional masking noise to decrease; and the change of the angle causes the horizontal projection of the masking direction and the horizontal projection of the natural masking noise direction to become more closely aligned with each other.

The method may further comprise setting the masking noise direction by rotating the noise generator, or by selecting the noise generator from a set of noise generators.

Optionally the masking noise direction is set on the basis of a location of a receptor, such as a neighbour of the wind turbine.

Optionally the RNA is oriented at a yaw angle, and the drive signal is based on the yaw angle.

Optionally the drive signal is enabled or changed on the basis of the yaw angle.

Optionally the drive signal is fed into the noise generator only for a specific operational envelope.

A further aspect of the invention provides a method of masking tonal noise from a wind turbine, the wind turbine comprising a masking noise generator and a rotor-nacelle-assembly (RNA), the RNA comprising a nacelle and a rotor, wherein the rotor defines an upwind direction, a downwind direction, an upstroke direction and a downstroke direction, the method comprising: feeding a drive signal into the noise generator so that the noise generator emits directional masking noise, wherein the directional masking noise at least partially masks tonal noise from the wind turbine and points in a masking direction with a horizontal projection, and at least a component of the horizontal projection of the masking direction points in the upwind direction or the upstroke direction.

A further aspect of the invention provides a computer program product comprising software code adapted to control noise masking apparatus when executed on a data processing system, the computer program product being adapted to perform the method of any aspect of the invention.

A further aspect of the invention provides a wind turbine comprising a noise generator; a control system; and a rotor-nacelle-assembly (RNA), wherein the RNA comprises a nacelle and a rotor configured to rotate about a rotor axis with a horizontal projection, the control system is configured to feed a drive signal into the noise generator so that the noise generator emits directional masking noise which at least partially masks tonal noise from the wind turbine and points in a masking direction with a horizontal projection, and the horizontal projection of the masking direction points away from the horizontal projection of the rotor axis.

BRIEF DESCRIPTION OF THE DRAWINGS

Embodiments of the invention will now be described with reference to the accompanying drawings, in which:

FIG. 1 shows a wind turbine system;

FIG. 2 shows a sound pressure spectrum recorded by a microphone;

DETAILED DESCRIPTION OF EMBODIMENT(S)

Figure 3:
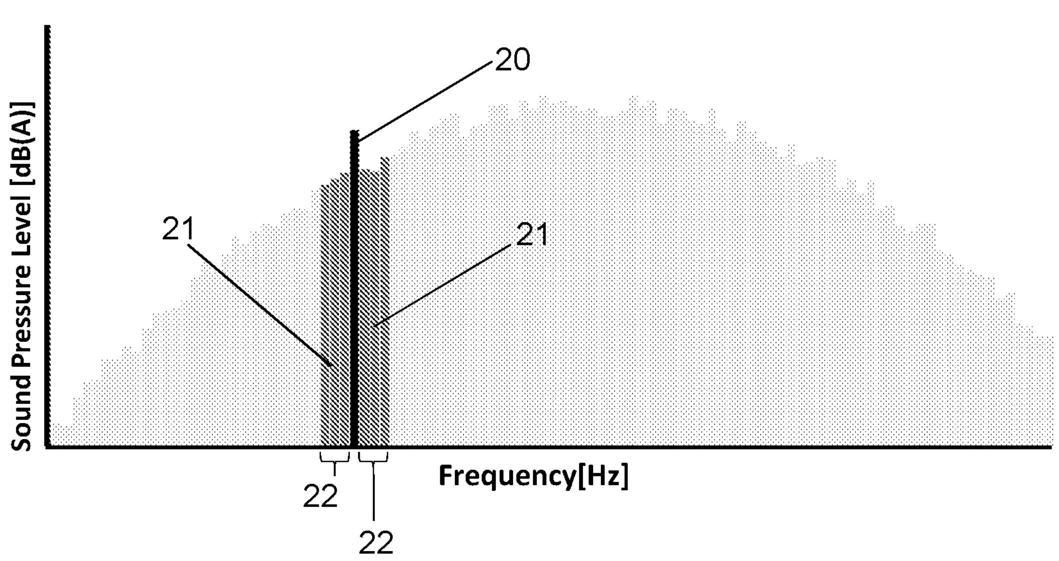
FIG. 3 shows a sound pressure level spectrum for a 10 s time period, including tonal noise and natural masking noise in a pair of critical bands.

FIG. 1 shows a wind turbine system 1 comprising a noise generator 6; a control system 100; and a rotor-nacelle-assembly (RNA) 3, 4 mounted on a tower 2. The RNA comprises a nacelle 4 to which a rotor 3 is mounted. The rotor comprises a plurality of wind turbine blades that extend radially from a central hub. In this example, the rotor 3 comprises three blades. The RNA 3, 4 can be rotated about a vertical yaw axis to change its yaw angle.

The system 1 includes an International Electrotechnical Commission (IEC) microphone 5 which records sound pressure. FIG. 2 is a spectrum of sound pressure measured by the microphone 5 versus frequency, presented as a graph with each spectral line representing sound pressure level (in dB(A)) in a respective frequency range. The range of each spectral line may be the same for each spectral line, or each spectral line may represent a one-third octave band. Typically, each spectral line covers a range of 1-2 Hz, although for ease of illustration FIG. 2 gives a lower resolution example in which each spectral line represents a range of the order of 10 Hz.

The spectrum of FIG. 2 is based on a ten second time period, and includes a tonal noise 20—i.e. a pure tone which occupies a narrow frequency range. If each spectral line represents a 10 Hz range, then the tonal noise 20 in this example may be in the 300-310 Hz frequency range. FIG. 3 shows the tonal noise 20, and natural masking noise 21 in a pair of critical bands 22 on either side of the frequency of the tonal noise 20. In this example the critical bands 22 each have a range of about 30 Hz, but in other embodiments the widths of the critical bands 22 may be higher or lower.

The natural masking noise 21 only partially masks the tonal noise 20, so the tonal noise 20 may be annoying.

The natural masking noise 21 may originate from a number of sources, including aero-acoustic noise from the rotor 3, ambient noise (for example seasonal noise from flora and fauna), or noise from wind turbine auxiliaries such as cooling fans.

The level of the natural masking noise 21 in the critical bands 22 can thus vary depending on a number of factors, including wind speed, turbine operating conditions, time of year and so on.

Figure 4:
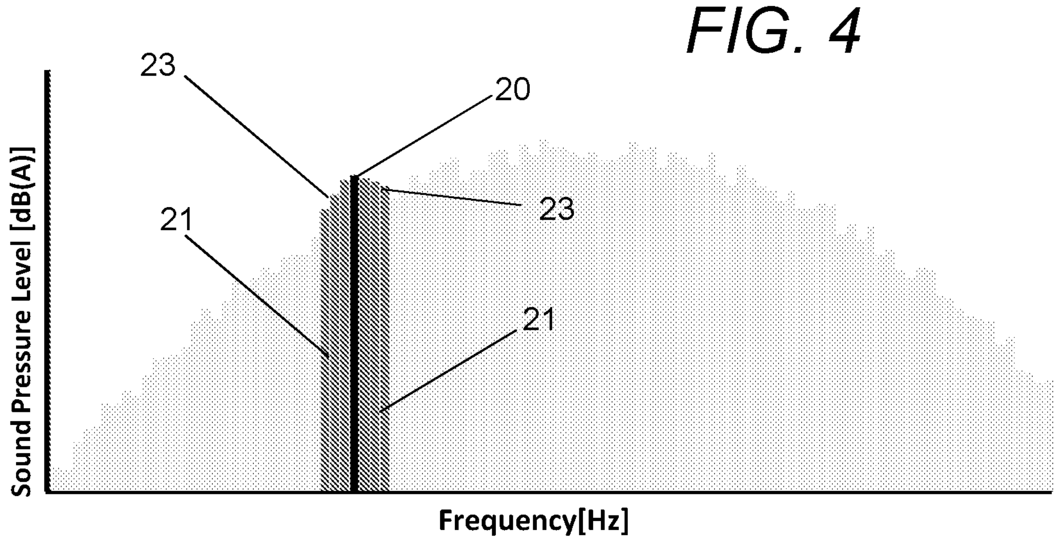
FIG. 4 shows the spectrum of FIG. 3 with additional masking noise added.

The control system 100 is configured to feed a drive signal into the noise generator 6 so that the noise generator 6 emits additional masking noise which at least partially masks the tonal noise 20 from the wind turbine as shown in FIG. 4. FIG. 4 is a spectrum showing the total masking noise in the critical bands 22. The total masking noise is made up by a combination of the natural masking noise 21 from the rotor 3 and other sources, and additional masking noise 23 from the noise generator 6.

The tonal noise 20 may be directional. That is, the tonal noise 20 may point in a particular direction (or a finite number of directions). This needs to be considered if there is a neighbour near the system 1. For example, a neighbour may not be affected as much by a tonal noise which points away from the neighbour. In this case, the additional masking noise 23 may not need to be as loud to successfully mask the tonal noise from the perspective of the neighbour.

In addition, the natural masking noise 21 may be directional. If the natural masking noise is pointing at the neighbour, then less additional masking noise may be required.

Figure 5A:
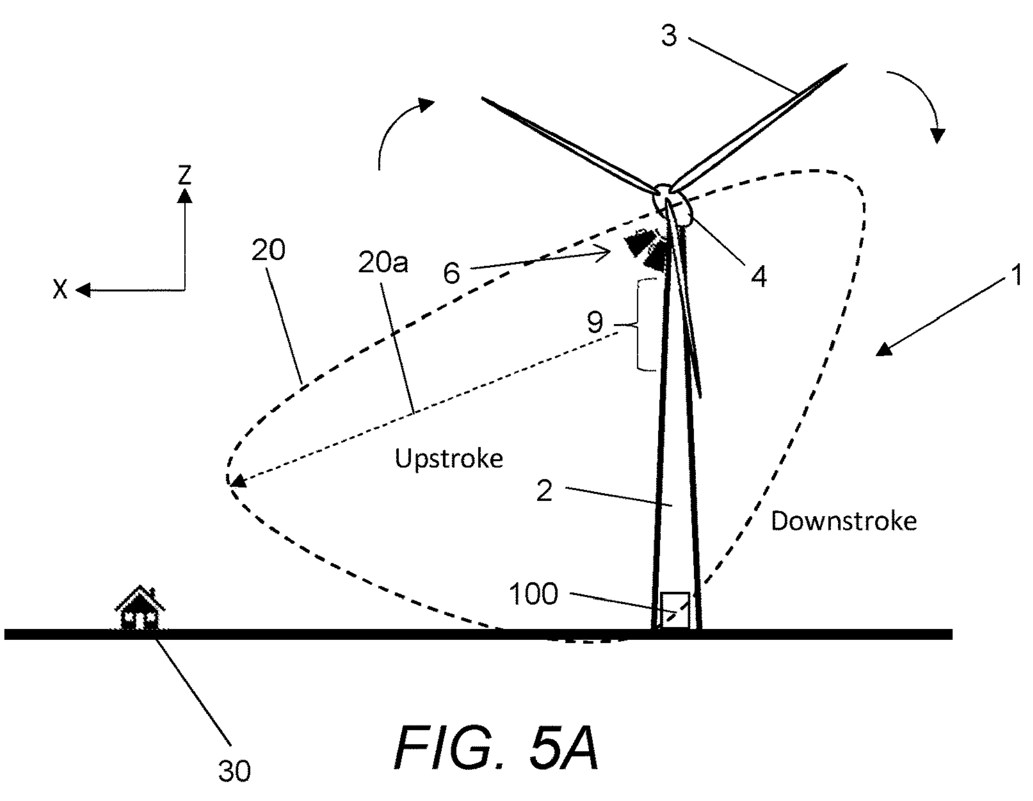
FIGS. 5A and 5B show a profile of tonal noise emitted by the wind turbine system.
Figure 5B:
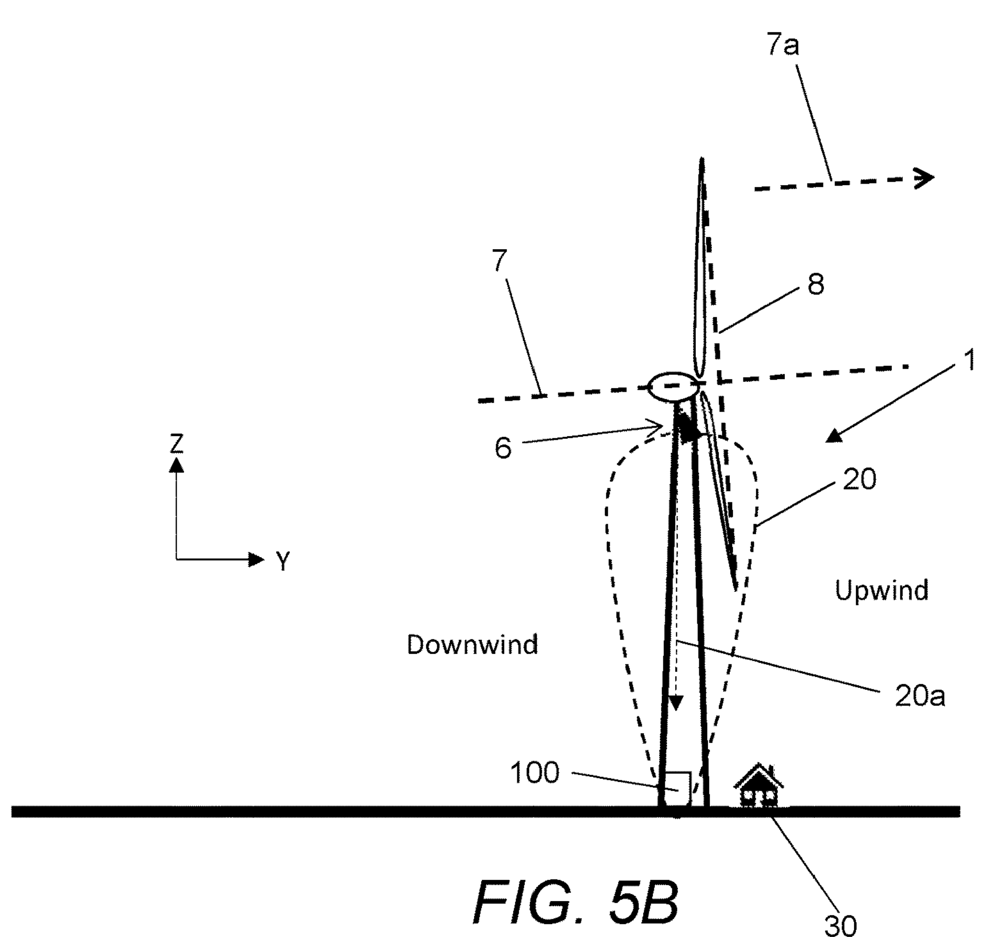

FIG. 5A and FIG. 5B show a possible directional profile of the tonal noise 20.

As shown in FIG. 5B, the rotor 3 is configured to rotate in a rotor plane 8 and about a rotor axis 7. The rotor 3 points in a rotor axis direction 7*a*. By definition, the horizontal projection of the rotor axis direction 7*a* points in the positive Y-direction, which is indicated in FIG. 5B.

Thus the rotor 3 defines an upwind direction, a downwind direction, an upstroke direction and a downstroke direction which are indicated in FIGS. 5A and 5B. A Cartesian coordinate frame is also shown—with a vertical Z-axis, and horizontal X and Y axes. The upstroke direction is defined herein as the positive X-direction, and the upwind direction is defined as the positive Y-direction.

The wind blows in the downwind direction and from the upwind direction. The rotor 3 rotates clockwise when viewed from the upwind direction as shown in FIG. 5A. The downstroke (negative X) direction is the crosswind direction where the blades are moving down, and the upstroke (positive X) direction is the crosswind direction where the blades are moving up.

The tonal noise 20 may originate from a source (such as a fan) within the nacelle 4, and it may be radiated by a radiating section 9 of the tower 2 on the upstroke side of the tower 2 as shown in FIG. 5A.

Since the tonal noise 20 is radiated from only one side of the tower 2, it is directional and points in a tonal noise direction 20*a*. The tonal noise direction 20*a* may be defined as the direction of maximum sound level of the tonal noise. In this case the tonal noise 20 has only a single lobe, with a single associated direction 20*a*. In other examples the tonal noise 20 may have a finite number of multiple lobes, each with a respective direction.

In this case the tonal noise direction 20*a* is inclined down, and points in the upstroke direction. This is exemplary only, and different types of tonal noise may point in different directions. Alternatively, the tonal noise 20 may be omni-directional.

Figure 6A:
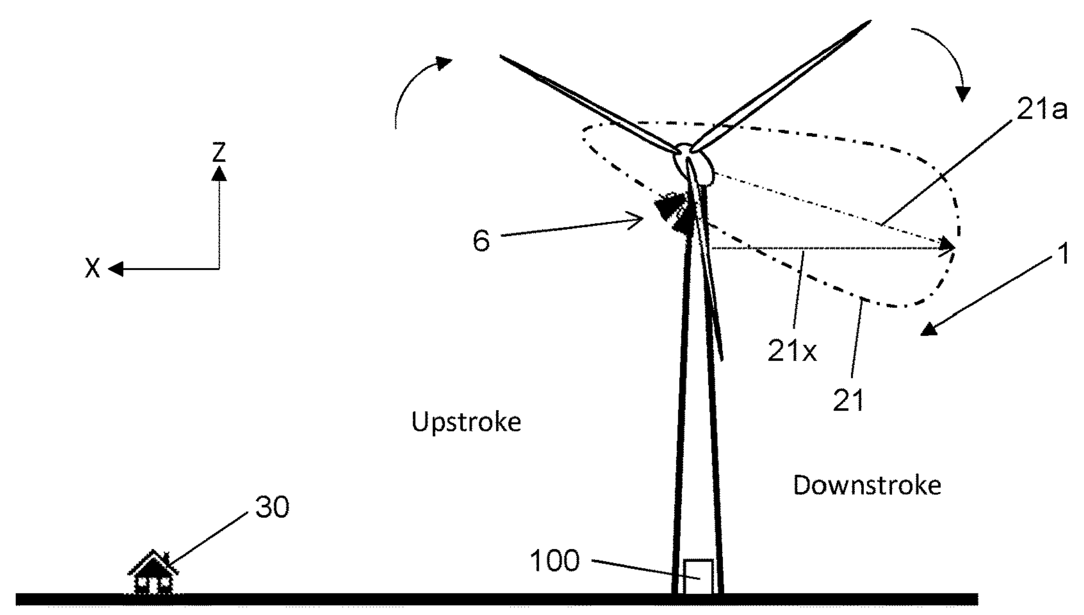
FIGS. 6A and 6B show a profile of natural masking noise emitted by the wind turbine system.
Figure 6B:
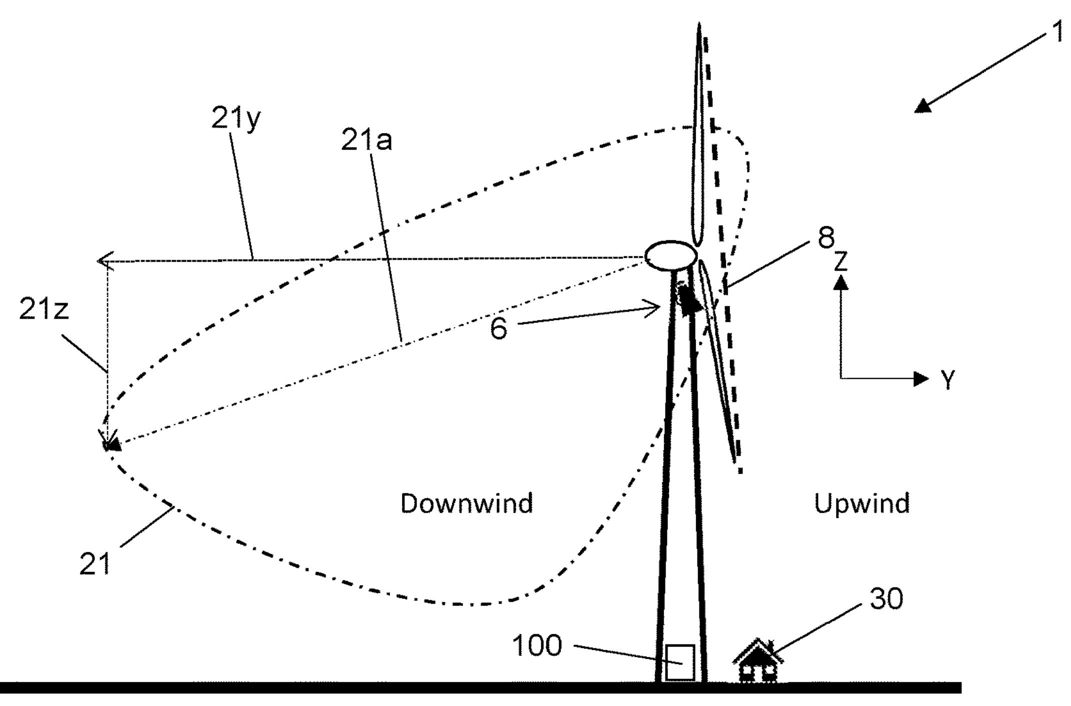

FIG. 6A and FIG. 6B show a possible directional profile of the natural masking noise 21. As explained above, the natural masking noise 21 may originate from many sources, including the movement of the rotor blades though the air.

The natural masking noise 21 points in a natural masking noise direction 21*a*. The natural masking noise direction 21*a* may be defined as the direction of maximum sound level of the natural masking noise 21. In this case the natural masking noise 21 has only a single lobe, with a single associated direction 21*a*. In other examples the natural masking noise 21 may have a finite number of multiple lobes, each with a respective direction.

The natural masking noise direction 21*a* is illustrated as a vector with X,Y,Z components labelled 21*x*, 21*y*, 21*z*. The natural masking noise direction 21*a* is inclined down, and has a component 21*x*, 21*y* in each horizontal direction (X, Y).

The magnitude of the downwind component 21*y* shown in FIG. 6A is greater than the magnitude of the downstroke component 21*x* shown in FIG. 6B. This is exemplary only, and different types of natural masking noise may point in different directions.

A large component 21*y* of the natural masking noise direction 21*a* is expected to be in the downwind direction since much of the natural masking noise 21 originates from the wind's interactions with the blades.

The natural masking noise direction 21*a* may point directly downwind (i.e. without any crosswind component) but more typically a component 21*x* of the natural masking noise direction 21*a* is expected to be in the downstroke direction as shown in FIG. 6A, due to the tiltback of the rotor plane 8. This tiltback causes the rotor blades to experience a higher wind speed during the downstroke than during the upstroke (since they are effectively moving into the wind during the downstroke). This is expected to result in the blades emitting more natural masking noise 21 on the downstroke side than on the upstroke side.

Figure 7A:
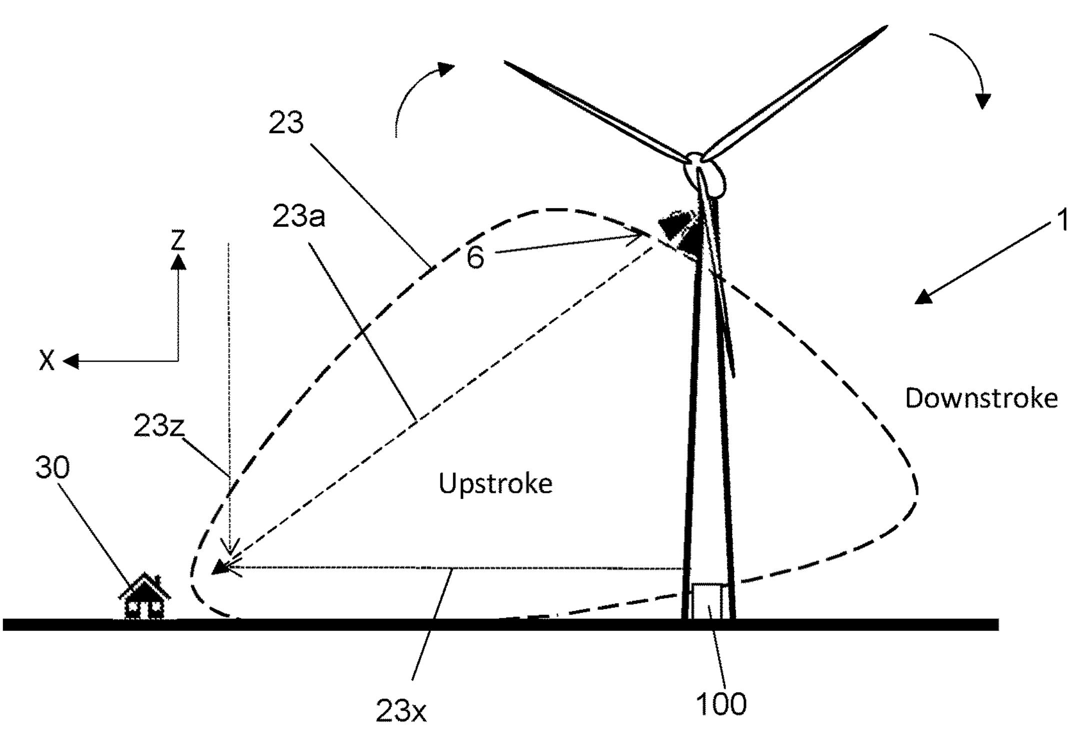
FIGS. 7A and 7B show a profile of additional masking noise emitted by the noise generator of the wind turbine system.
Figure 7B:
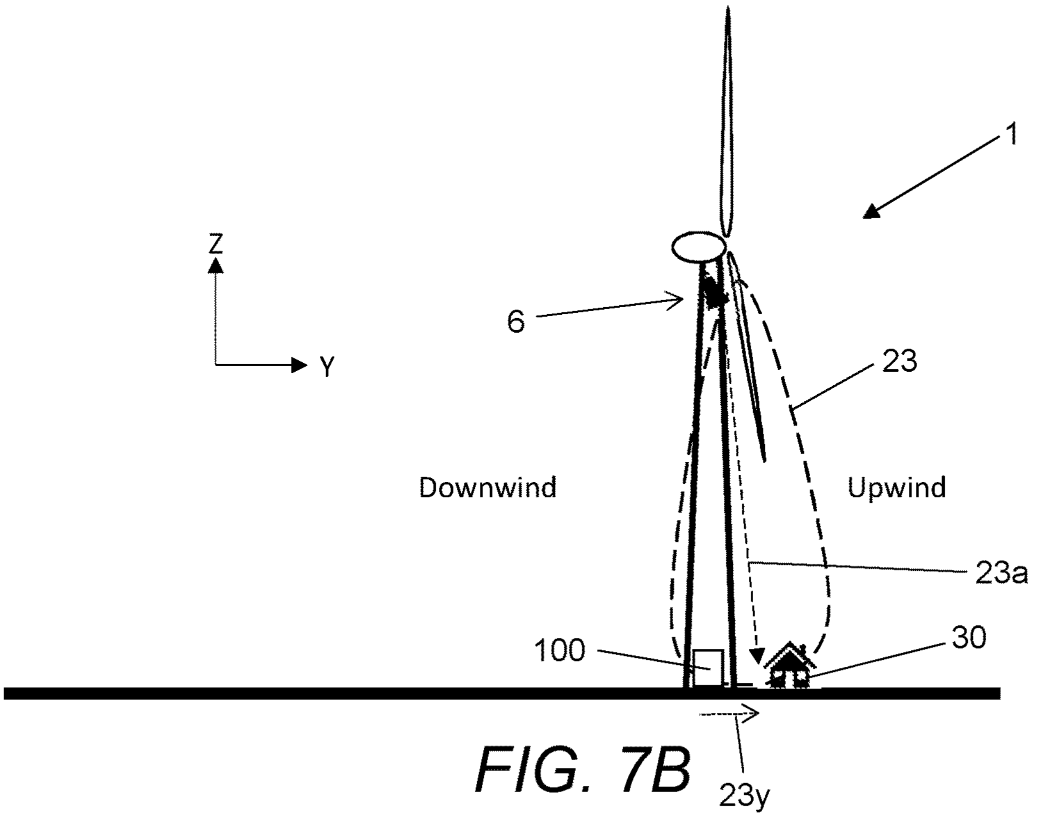

The control system 100 feeds a drive signal (or drive signals) into the noise generator 6 so that the noise generator 6 emits directional masking noise 23 shown in FIGS. 7A and 7B. The directional masking noise 23 at least partially masks the tonal noise 20 from the wind turbine and points down in a masking direction 23*a*.

To distinguish over the natural masking noise 21, the directional masking noise 23 is referred to below as directional masking noise 23 and the masking direction 23*a* as the additional masking noise direction 23*a*.

The additional masking noise direction 23*a* may be defined as the direction of maximum sound level of the additional masking noise 23. In this case the additional masking noise 23 has a directional sound profile with only a single lobe. If the sound profile has multiple lobes then the additional masking noise direction 23*a* is defined by the largest lobe.

The additional masking noise direction 23*a* is illustrated as a vector with X,Y,Z components labelled 23*x*, 23*y*, 23*z*. The additional masking noise direction 23*a* is inclined down, and has a component 23*x*, 23*y* in each horizontal direction X, Y. The magnitude of the upwind component 23*y* (FIG. 7B) is less than the magnitude of the upstroke component 21*x* (FIG. 7A). This is exemplary only, and the additional masking noise direction 23*a* may be adjusted as required.

The noise generator 6 may be a loudspeaker, a set of loudspeakers, or any other element (or set of elements) which can be driven by an electrical drive signal (or signals) to produce a masking noise at the appropriate range of frequencies. In this example, the noise generator 6 is illustrated as a pair of loudspeakers mounted to the top of the tower. In other embodiments, described further below, the noise generator 6 may be carried by the nacelle 4—for instance suspended under the nacelle 4 or housed inside the nacelle 4. In either case, the noise generator 6 may also be mounted via a pivot to the tower or the nacelle, so it can be rotated relative to the RNA about a vertical yaw axis to change its yaw angle. This enables the additional masking noise direction 23*a* to be set by yawing the noise generator 6 on its pivot to change its yaw angle.

The noise generator 6 could have a preferential yaw angle (based on neighbors or the most dominant wind direction), or it could yaw in anticipation based on communication about incoming wind conditions from neighboring turbines.

Figure 8A:
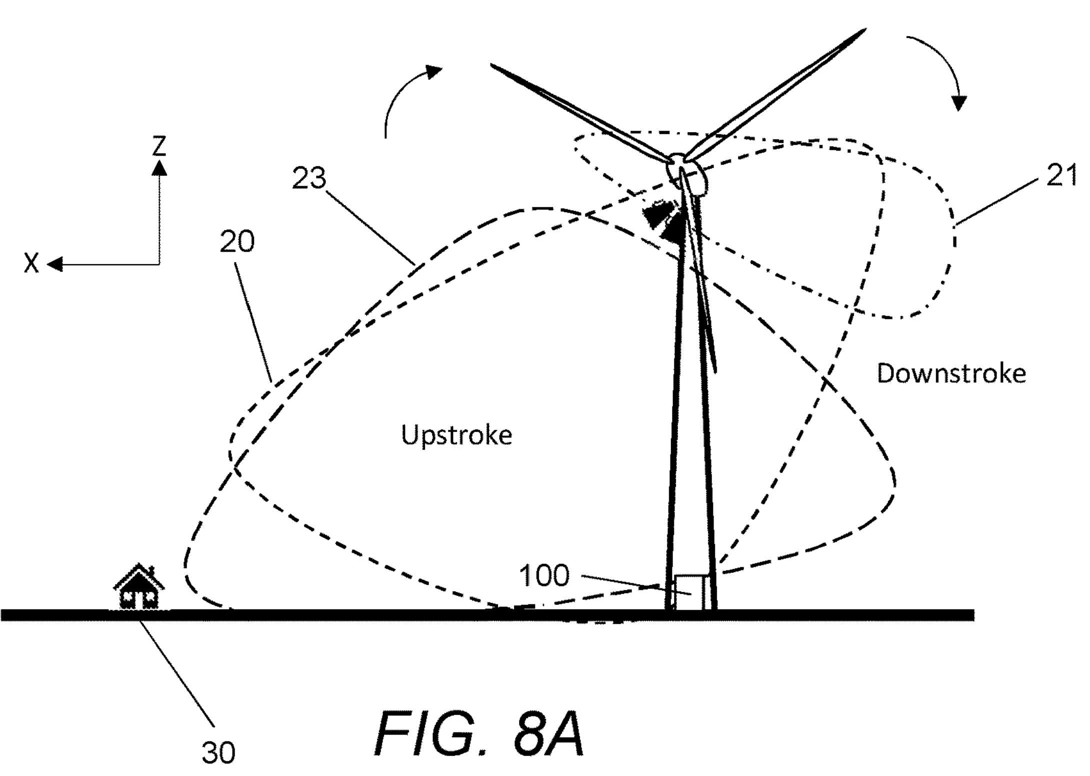
FIGS. 8A and 8B show a superposition of the noises.
Figure 8B:
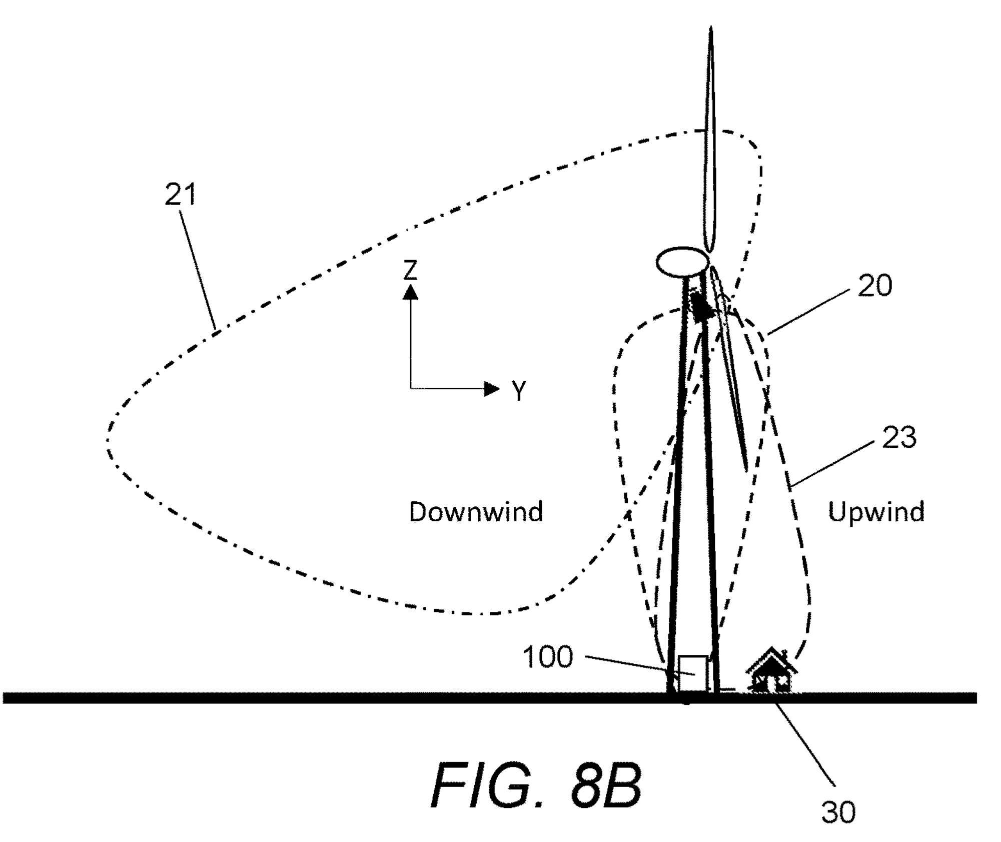

FIG. 8A and FIG. 8B show the tonal noise 20, the natural masking noise 21, and the additional masking noise 23 in a single view.

Figure 9A:
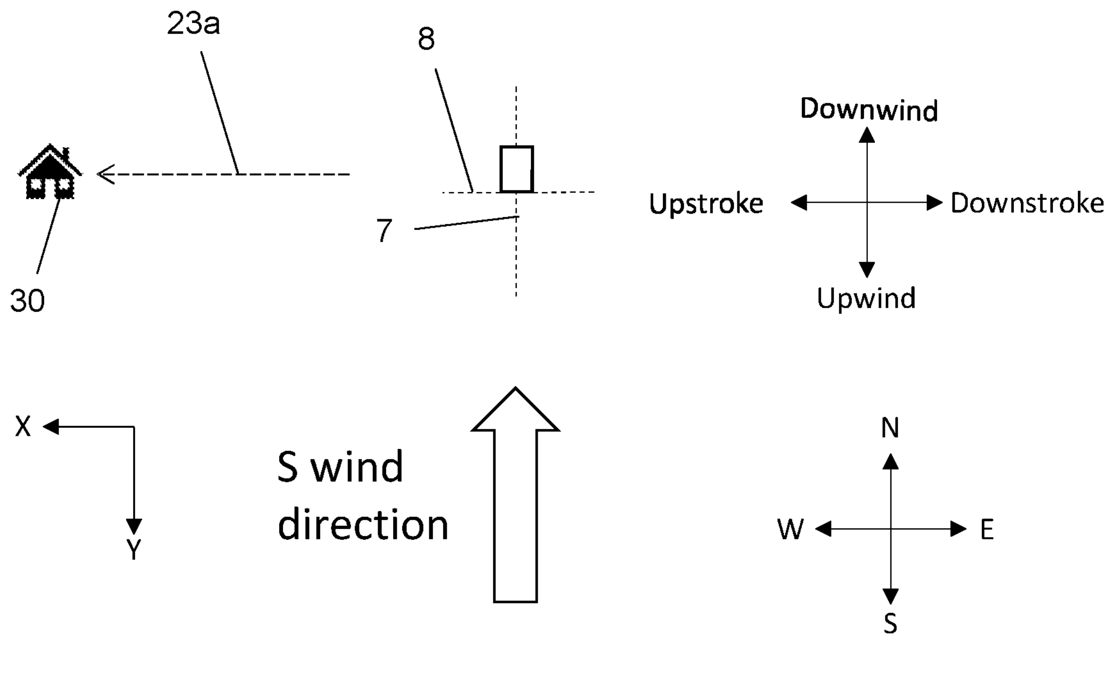
FIG. 9A is plan view showing additional masking noise pointing at a neighbour in an upstroke direction.

FIG. 9A is a plan view of the RNA with the rotor oriented to face a southerly wind. Since FIG. 9A is a plan view, it shows the horizontal projections of the rotor axis 7 and the additional masking noise direction 23*a*. Note that the orientation of the (X,Y,Z) frame of reference is defined by the yaw angle of the RNA, which sets the rotor axis direction 7*a* indicated in FIG. 9B. The horizontal projection of the rotor axis direction 7*a* is defined as pointing in the positive Y-direction.

The noise generator 6 is oriented so that the horizontal projection of the additional masking noise direction 23*a* points at a neighbour 30 located west of the RNA in the upstroke direction.

Figure 9B:
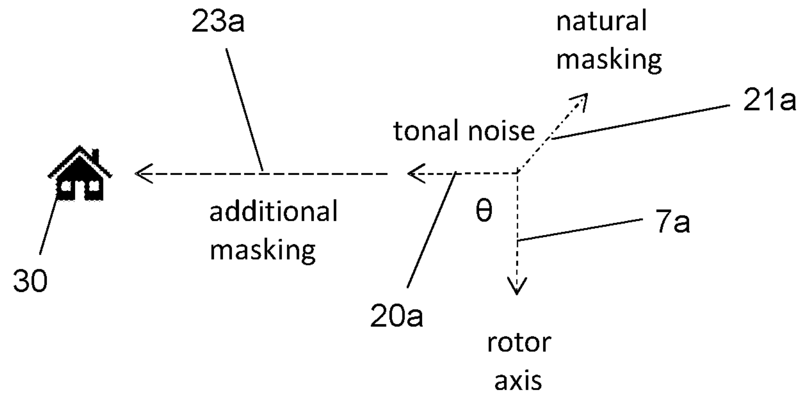
FIG. 9B is a plan view showing the relative angles of the horizontal projections of the noise directions and the rotor axis direction, in the case of FIG. 9A.

FIG. 9B is a plan view showing the horizontal projections of the rotor axis direction 7*a*, the tonal noise direction 20*a*, the natural masking direction 21*a* and the additional masking noise direction 23*a*, in the case of FIG. 9A. When the RNA is set at the yaw angle shown in FIG. 9B, the horizontal projection of the rotor axis direction 7*a* is oriented at an angle θ of −90° relative to the horizontal projection of the additional masking noise direction 23*a*.

As shown in FIG. 9B, the horizontal projection of the additional masking noise direction 23*a* is oriented parallel with the horizontal projection of the tonal noise direction 20*a*. In other words, the additional masking noise 23 and the tonal noise 20 both point west, generally in the same (upstroke) direction towards the neighbour 30. The horizontal projection of the natural masking direction 21*a*, on the other hand, is not aligned with the horizontal projection of the tonal noise direction 20*a* and points north-east, generally away from the neighbour 30. Thus the natural masking noise 23 and the tonal noise 20 point in generally opposing directions. So from the perspective of the neighbour 30, the natural masking noise 23 is relatively quiet and not effective in masking the tonal noise 20. So the additional masking noise 23 is set by the control system 100 at a high sound power level. The length of the arrow representing the horizontal projection of the natural masking noise direction 23*a* is relatively long in FIGS. 9A and 9B to schematically illustrate this.

Figure 10A:
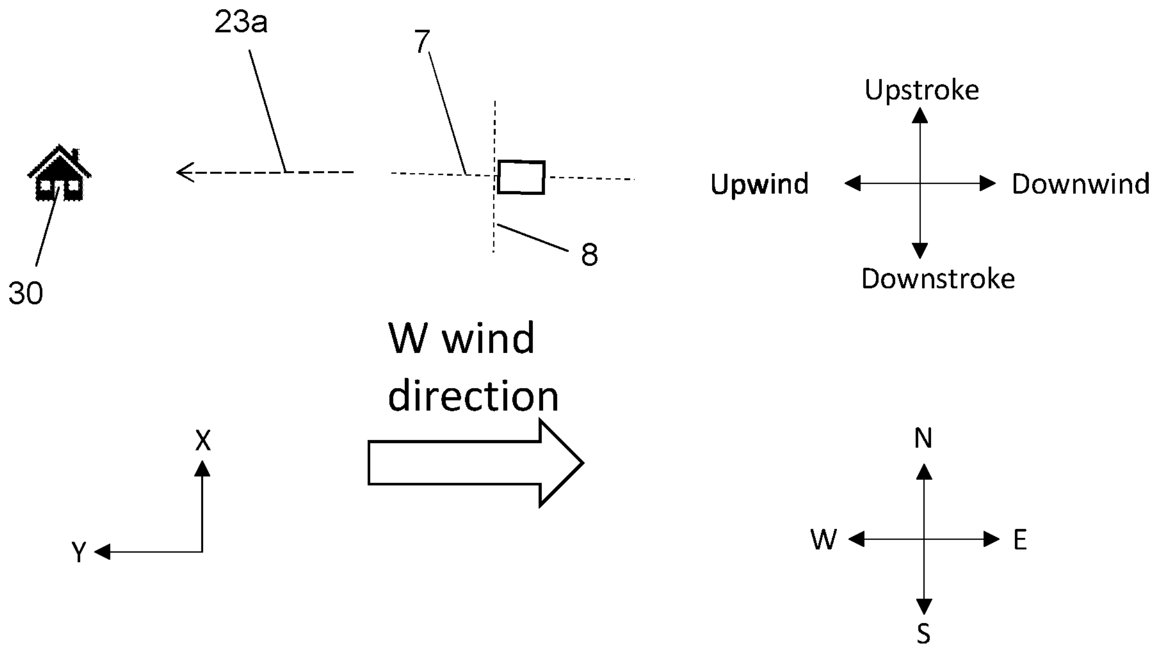
FIG. 10A is plan view showing additional masking noise pointing at the neighbour in an upwind direction.

FIG. 10A is a plan view of the RNA with the rotor oriented to face a westerly wind. Since the noise generator 6 is mounted to the tower 2, the additional masking noise direction 23*a* does not change as the RNA rotates about the yaw axis. Therefore the horizontal projection of the additional masking noise direction 23*a* continues to point at the neighbour 30, west of the RNA, which is now in the upwind direction.

Figure 10B:
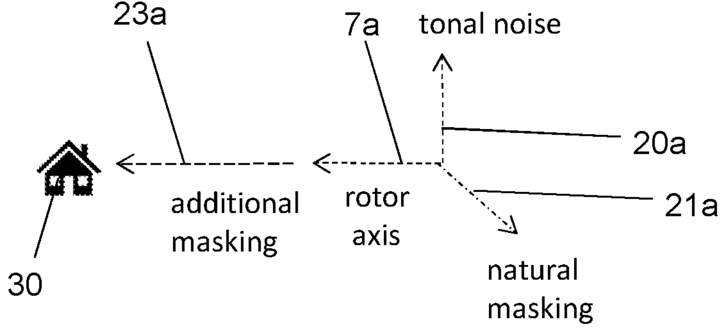
FIG. 10B is a plan view showing the relative angles of the horizontal projections of the noise directions and the rotor axis direction, in the case of FIG. 10A.

FIG. 10B is a plan view showing the horizontal projections of the rotor axis direction 7*a*, the tonal noise direction 20*a*, the natural masking direction 21*a* and the additional masking noise direction 23*a*, in the case of FIG. 10A. As shown in FIG. 10B, the horizontal projection of the rotor axis direction 7*a* is now oriented at an angle of 0° relative to the horizontal projection of the additional masking noise direction 23*a* (i.e. they are parallel).

The horizontal projection of the additional masking noise direction 23*a* is at right angles to the horizontal projection of the tonal noise direction 20*a* (which is now pointing north). From the perspective of the neighbour 30, the natural masking noise 23 remains relatively quiet, but the tonal noise 20 is no longer pointing directly at the neighbour 30, so less additional masking noise 23 is needed. The control system 100 changes the drive signal so that the additional masking noise 23 is reduced to a lower sound power level, compared with FIGS. 9A and 9B.

Figures 11A, 11B:
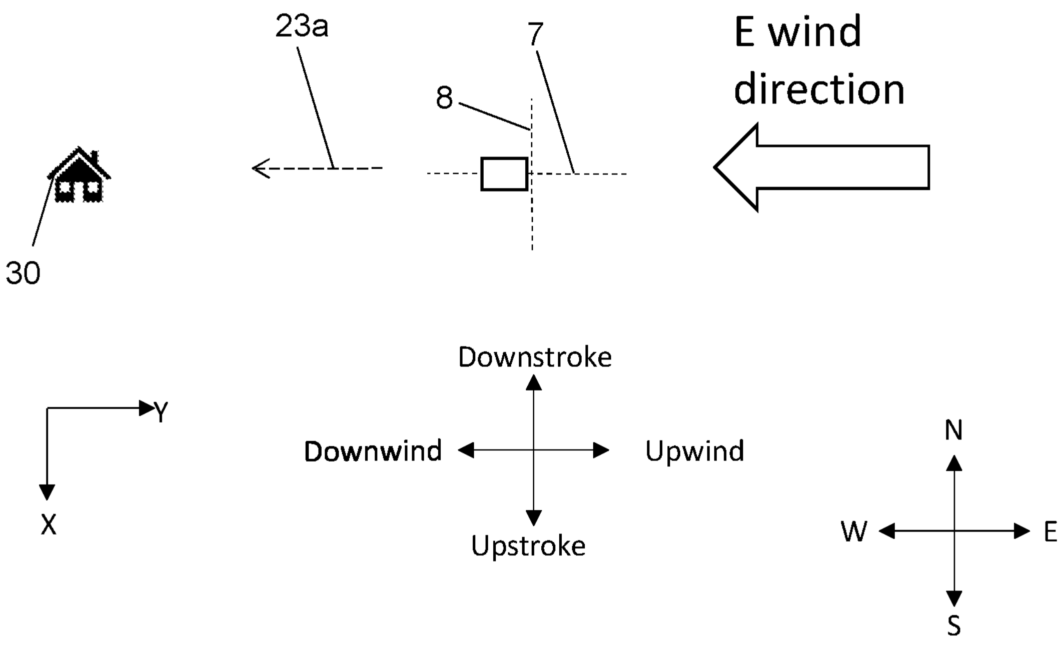
FIG. 11A is plan view showing additional masking noise pointing at the neighbour in a downwind direction.
FIG. 11B is a plan view showing the relative angles of the horizontal projections of the noise directions and the rotor axis direction, in the case of FIG. 11A.

FIG. 11A is a plan view of the RNA, with the rotor oriented to face an easterly wind. The horizontal projection of the additional masking noise direction 23*a* continues to point at the neighbour 30, west of the RNA, which is now in the downwind direction.

FIG. 11B is a plan view showing the horizontal projections of the rotor axis 7, the tonal noise direction 20*a*, the natural masking direction 21*a* and the additional masking noise direction 23*a*, in the case of FIG. 11A. The horizontal projection of the rotor axis direction 7*a* is now oriented at an angle of 180° relative to the horizontal projection of the additional masking noise direction 23*a* (i.e. they are anti-parallel).

As with FIG. 10B, the horizontal projection of the additional masking noise direction 23*a* is at right angles with the horizontal projection of the tonal noise direction 20*a* (which is now pointing south). From the perspective of the neighbour 30, the natural masking noise 21 is louder than in the case of FIG. 10B, so less additional masking noise 23 is needed. The control system 100 changes the drive signal, so that the additional masking noise 23 is reduced to a lower sound power level, compared with FIGS. 10A and 10B.

Figure 12A:
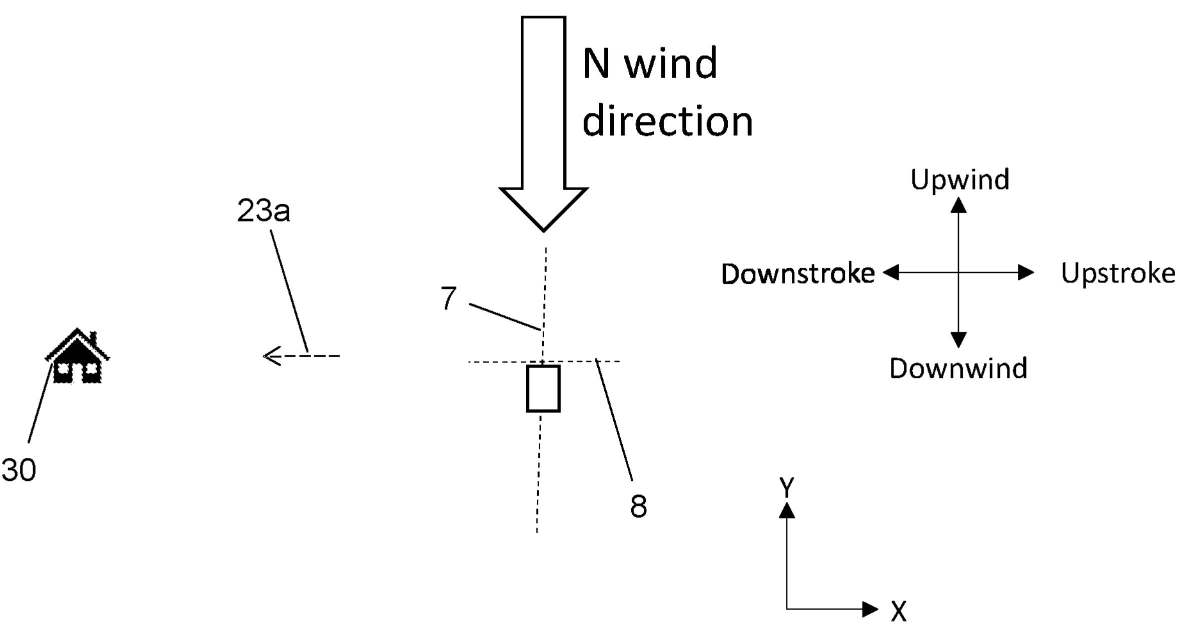
FIG. 12A is plan view showing additional masking noise pointing at the neighbour in a downstroke direction.

FIG. 12A is a plan view of the RNA with the rotor oriented to face a northerly wind. The horizontal projection of the additional masking noise direction 23*a* continues to point at the neighbour 30, west of the RNA, which is now in the downstroke direction.

Figure 12B:
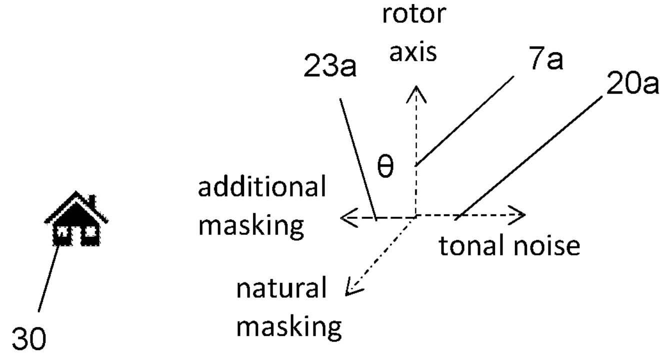
FIG. 12B is a plan view showing the relative angles of the horizontal projections of the noise directions and the rotor axis direction, in the case of FIG. 12A.

FIG. 12B is a plan view showing the horizontal projections of the rotor axis 7, the tonal noise direction 20*a*, the natural masking direction 21*a* and the additional masking noise direction 23*a*, in the case of FIG. 12A. The horizontal projection of the rotor axis direction 7*a* is now oriented at an angle θ of +90° relative to the horizontal projection of the additional masking noise direction 23*a*.

The horizontal projection of the additional masking noise direction 23*a* is directly opposed to the horizontal projection of the tonal noise direction 20*a* (which is now pointing east). From the perspective of the neighbour 30, the natural masking noise 23 is now relatively loud, and the tonal noise 20 is pointing directly away from the neighbour 30 so the additional masking noise 23 can be reduced further. The control system 100 changes the drive signal so that the additional masking noise 23 is reduced to a lower sound power level, compared with FIGS. 11A and 11B.

When the wind is westerly (FIG. 10A) or easterly (FIG. 11A) then the horizontal projection of the additional masking direction 23*a* is parallel to the horizontal projection of the rotor axis 7. That is, the horizontal projection of the additional masking direction 23*a* points directly upwind or downwind.

For all other wind directions (including FIG. 9A and FIG. 12A) the horizontal projection of the additional masking direction 23*a* points away from the horizontal projection of the rotor axis 7—i.e. it points "off-axis". In other words, the horizontal projection of the additional masking direction 23*a* has at least a component in a crosswind direction (upstroke or downstroke). This can be contrasted with DE 102015 008812 A1, in which the additional masking noise direction is parallel with the rotor axis for all wind directions. For the reasons explained above, it has been found to be beneficial to point the additional masking noise 23 "off-axis" (i.e. with at least a component in a crosswind direction) in order to provide more effective masking performance.

As described above, the horizontal projection of the rotor axis direction 7*a* is oriented at an angle θ relative to the horizontal projection of the additional masking direction 23*a*. Since the noise generator 6 is mounted to the tower 2 rather than the RNA, this angle θ changes as the RNA rotates about the yaw axis. As described above, a characteristic of the directional masking noise 23 may be set on the basis of this angle θ. For instance, the control system 100 may change the drive signal(s) driving the noise generator 6 in accordance with the change of angle, thereby changing a characteristic of the directional masking noise (for instance changing its sound power or frequency profile).

If the horizontal projection of the additional masking noise direction 23*a* and the horizontal projection of the tonal noise direction 20*a* are parallel or at least closely aligned with each other (as in FIG. 9B) then a high sound power level may be required from the noise generator 6. Thus when these directions 23*a*, 20*a* become more closely aligned with each other, the control system 100 may change the drive signal(s) to cause a sound power of the additional masking noise 23 to increase.

If the horizontal projection of the additional masking noise direction 23*a* and the horizontal projection of the natural masking noise direction 21*a* are parallel or closely aligned with each other (as in FIG. 11B and FIG. 12B) then a low sound power level may be required from the noise generator 6. Thus when these directions 23*a*, 21*a* become more closely aligned with each other, the control system 100 may change the drive signal(s) to cause a sound power of the additional masking noise 23 to decrease.

Figure 13A:
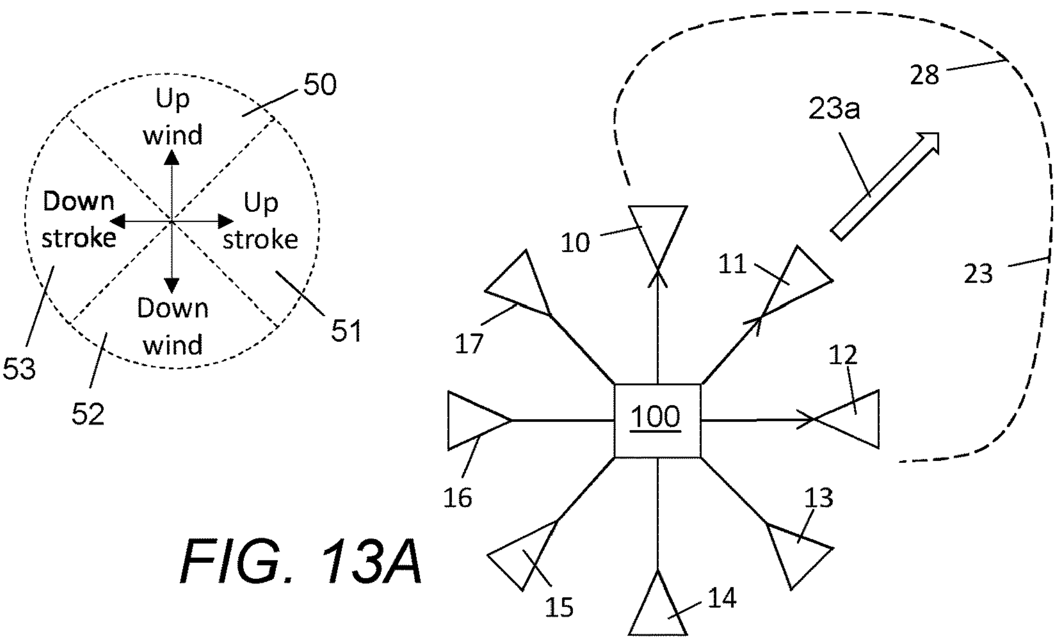
FIG. 13A shows an array of loudspeakers with a first subset of three loudspeakers being driven to emit additional masking noise in an upstroke and/or upwind direction.

In the examples given above, the noise generator 6 comprises a pair of loudspeakers pivotally mounted to the tower 2. FIG. 13A shows an alternative noise generator—in this case a set of eight loudspeakers 10-17. The control system 100 is also shown, along the with the upwind, downwind, upstroke and downstroke directions. Each of the four directions has an associated quadrant 50-53.

Each loudspeaker 10-17 is directional and directs the majority of its generated sound power in the direction its speaker cone is facing. Although FIG. 13A shows eight loudspeakers, any number of loudspeakers may be used and in any 2D or 3D orientation, for example an array of speakers may take the form of a sphere, or half sphere.

FIG. 13A shows an example in which a first subset 10-12 of the speakers is driven by the control system 100 to generate additional masking noise 23. The arrow heads on the control lines from the control system 100 indicate the drive signals which are enabled to generate additional masking noise 23. The additional masking noise 23 comprises a lobe formed from the superposition of the sound from the three loudspeakers 10-12. The lobe provides a global maximum 28 which defines the additional masking noise direction 23*a*. The horizontal projection of the additional masking direction 23*a* points in the upwind direction and the upstroke direction.

The drive signals for the other five speakers 13-17 are disabled. The number of driven speakers in the first subset 10-12 is an example only, and in general the first subset may comprise one or more loudspeakers. Loudspeakers in the upwind and upstroke directions are chosen because they are the directions in which the natural masking noise is the least powerful and the tonal noise is most prevalent (see above).

The horizontal projection of the masking direction 23*a* points along the boundary between the upwind quadrant 50 and the upstroke quadrant 51 (so it effectively points in both quadrants). In this example, no additional masking noise is emitted in the downwind quadrant 52 or the downstroke quadrant 53.

FIG. 13A can be contrasted with DE 102015 008812 A1, in which the additional masking noise direction points in the downwind direction. For the reasons explained above, it has been found to be beneficial for the additional masking noise direction 23*a* to point in the upwind quadrant 50 (where there may be less natural masking noise) or in the upstroke quadrant 51 (where there may be less natural masking noise and/or more tonal noise).

Figure 13B:
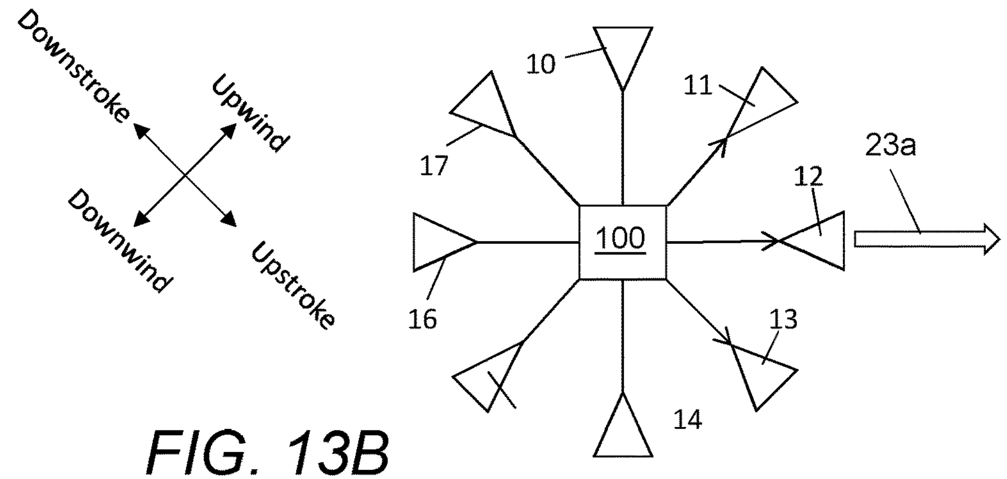
FIG. 13B shows the array of FIG. 13A after a wind shift, without rotation of the array.

FIG. 13B shows the system of FIG. 13A after a 45° change in wind direction. In the case of FIG. 13B, the loudspeakers 10-17 are mounted to the tower. So as the RNA yaw angle changes, they do not move.

The loudspeaker 11 that was previously pointing in the upwind/upstroke direction, now points in the upwind direction. The loudspeaker 12 that was previously pointing in the upstroke direction, now points in the upwind/upstroke direction.

As a result, the loudspeaker 10 that was previously emitting additional masking noise in the upwind direction is disabled by the control system 100, and the previously inactive loudspeaker 13 which is now pointing in the upstroke direction is enabled by the control system 100.

Thus FIGS. 13A and 13B show a method of setting the masking noise direction by selecting a subset of one or more noise generators from the set of noise generators 10-17. As the yaw angle changes to the yaw angle shown in FIG. 13B, a different subset 11-13 of the loudspeakers is selected and driven, so the additional masking noise continues to point in the upwind and upstroke quadrants regardless of the yaw angle of the RNA.

Figure 13C:
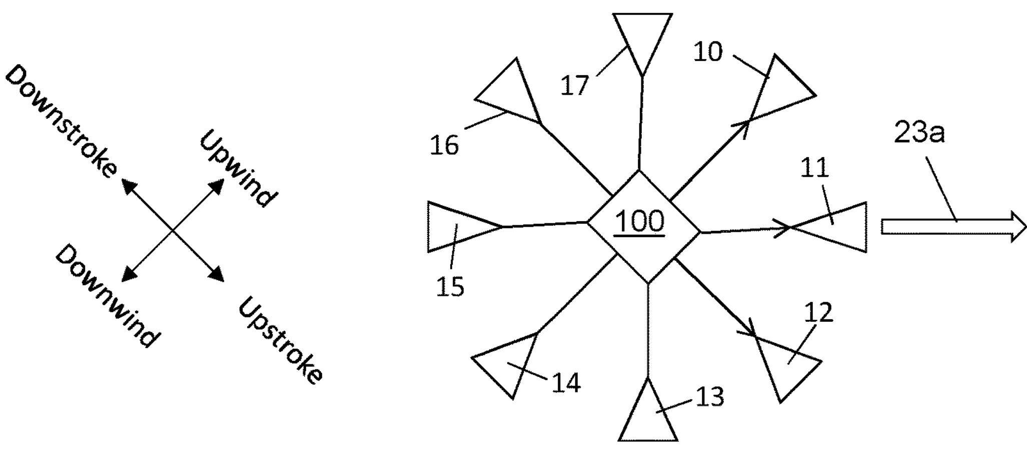
FIG. 13C shows the array of FIG. 13A after the wind shift, with rotation of the array.

FIG. 13C shows an alternative arrangement, for a case in which the loudspeakers 10-17 are mounted to the RNA. As the RNA yaw angle changes, the set of loudspeakers 10-17 rotates with the RNA. In the case of FIG. 13C, the first subset 10-12 of the speakers continue to be driven by the control system 100 to generate the additional masking noise in the upwind and upstroke quadrants.

If the loudspeakers are mounted to the RNA (as in FIG. 13C) and additional masking noise is only required in the upwind and upstroke quadrants for all operating conditions, then only three loudspeakers 10-12 may be required rather than the full array of eight loudspeakers 10-17.

Figures 14A, 14B, 14C:
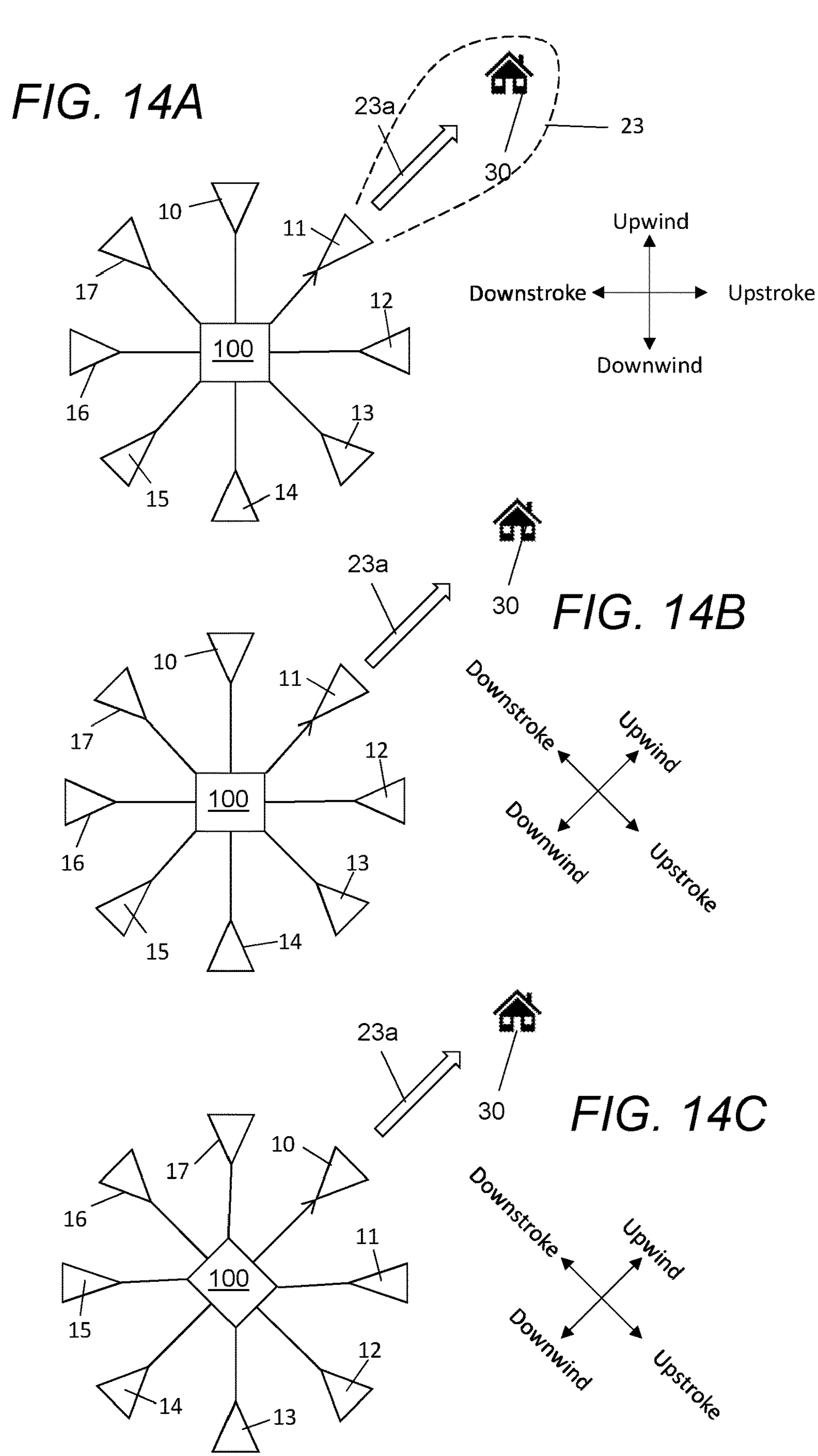
FIG. 14A shows the array of loudspeakers with a single loudspeaker being driven to emit additional masking noise towards a neighbour.
FIG. 14B shows the array of FIG. 14A after a wind shift, without rotation of the array.
FIG. 14C shows the array of FIG. 13A after the wind shift, with rotation of the array.

FIG. 14A shows an alternative method of driving the loudspeakers 10-17. In this case, only a single loudspeaker 11 is driven to generate additional masking noise 23 pointing at a neighbour 30.

FIG. 14B shows the system after a 45° change in wind direction from FIG. 14A. In the case of FIG. 14B, the loudspeakers 10-17 are mounted to the tower, so as the RNA yaw angle changes they do not move. In the case of FIG. 14B, the loudspeaker 11 continues to be driven by the control system 100 to generate the additional masking noise pointing at the neighbour 30.

Optionally the amplitude of the additional masking noise 23 is updated after the 45° change of wind direction based on the inputs by the drive signal, which rely on the tonal noise and natural masking as described above in relation to FIGS. 9-12. Alternatively the amplitude may not change.

FIG. 14C shows an alternative arrangement, for a case in which the loudspeakers 10-17 are mounted to the RNA, so as the RNA yaw angle changes the set of loudspeakers 10-17 rotates with the RNA. In the case of FIG. 14C, the drive signal for the loudspeaker 11 is disabled by the control system 100, and the drive signal for the loudspeaker 10 is enabled by the control system 100 to generate the additional masking noise pointing at the neighbour.

If there are multiple neighbours, a subset of one or more loudspeakers may be assigned to each neighbour to achieve similar results.

The methods of FIGS. 13A-130 and FIGS. 14A-14C are not mutually exclusive. Thus the control system 100 may drive one or more of the loudspeakers 10-17 to generate additional masking noise in a chosen quadrant (for instance upstroke or downstroke), at the same time as driving one or more of the loudspeakers 10-17 to generate additional masking noise which points at a neighbour.

To summarise the embodiments described above, a drive signal is fed by the control system 100 into a noise generator so that the noise generator emits directional additional masking noise 23 which at least partially masks tonal noise 20 from the wind turbine. The noise generator may be a single element (such a loudspeaker 11) fed by a single drive signal. The additional masking noise 23 generated by the element is directional and points in a masking direction 23*a*. Alternatively the noise generator may comprise multiple elements (such as loudspeakers 10-12) fed by multiple drive signals. In this case the superposition of the additional masking noise 23 generated by the multiple elements is directional and points in a masking direction 23*a*.

The rotor 3 defines an upwind direction, a downwind direction, an upstroke direction and a downstroke direction. In some embodiments, at least a component of the horizontal projection of the additional masking noise direction 23*a* points in the upwind direction or the upstroke direction. In some embodiments, at least a component of the horizontal projection of the additional masking noise direction 23*a* points in the upstroke direction or the downstroke direction.

The rotor 3 also defines an upwind quadrant 50, a downwind quadrant 52, an upstroke quadrant 51 and a downstroke quadrant 53. In some embodiments, the horizontal projection of the additional masking noise direction 23*a* points in the upwind quadrant (FIG. 10A) or the upstroke quadrant (FIG. 7A). In some embodiments, the horizontal projection of the additional masking noise direction 23*a* points in the upstroke quadrant (7A) or the downstroke quadrant (FIG. 12A). In some embodiments, the horizontal projection of the additional masking noise direction 23*a* points in the upstroke quadrant (7A) or the downstroke quadrant (FIG. 12A) or the upwind quadrant (FIG. 10A).

The drive signal(s) may be fed into the noise generator only for a specific operational envelope. For instance the noise generator may be actuated by the control system 100 on the basis of lookup tables, which contain parameters such as, rpm, wind speed, power production, yaw angle, pitch angle, time of year, etc.

The control system 100 may be implemented in software, as a computer program product comprising software code adapted to control noise masking apparatus when executed on a data processing system, the computer program product being adapted to perform the method as described in any of the examples above.

Although the invention has been described above with reference to one or more preferred embodiments, it will be appreciated that various changes or modifications may be made without departing from the scope of the invention as defined in the appended claims.

The invention claimed is:

1. A method of masking tonal noise from a wind turbine, the wind turbine comprising a noise generator and a rotor-nacelle-assembly (RNA), the RNA comprising a nacelle and a rotor configured to rotate about a rotor axis with a horizontal projection, the method comprising:

feeding a drive signal into the noise generator so that the noise generator emits directional masking noise, wherein the directional masking noise at least partially masks tonal noise from the wind turbine and points in a masking direction with a horizontal projection, and wherein the horizontal projection of the masking direction points away from the horizontal projection of the rotor axis.

2. The method according to claim 1 further comprises rotating the RNA about a yaw axis to change a yaw angle of the RNA, wherein the masking direction does not change as the yaw angle changes.

3. The method according to claim 1 further comprises rotating the RNA about a yaw axis to change a yaw angle of the RNA, wherein the masking direction changes as the yaw angle changes.

4. The method according to claim 1 wherein the rotor defines an upwind direction, a downwind direction, an upstroke direction and a downstroke direction; and at least a component of the horizontal projection of the masking direction points in the upwind direction or the upstroke direction.

5. The method according to claim 1 wherein the horizontal projection of the rotor axis is oriented at an angle relative to the horizontal projection of the masking direction, and the method comprises: changing the angle by rotating the RNA about a yaw axis; and changing the drive signal in accordance with the change of angle, thereby changing a characteristic of the directional masking noise.

6. The method according to claim 1 wherein the horizontal projection of the masking direction is at an angle relative to the horizontal projection of the rotor axis; and a characteristic of the directional masking noise is set on the basis of the angle.

7. The method according to claim 5 wherein the characteristic of the directional masking noise is a frequency profile or sound power of the directional masking noise.

8. The method according to claim 5 wherein changing the drive signal causes a sound power of the directional masking noise to increase; the tonal noise is a directional tonal noise which points in a tonal noise direction with a horizontal projection; and the change of the angle causes the horizontal projection of the masking direction and the horizontal projection of the tonal noise direction to become more closely aligned with each other.

9. The method according to claim 5 further comprising generating directional natural masking noise, wherein the directional natural masking noise at least partially masks the tonal noise and points in a natural masking noise direction with a horizontal projection, wherein changing the drive signal causes a power of the directional masking noise to decrease; and the change of the angle causes the horizontal projection of the masking direction and the horizontal projection of the natural masking noise direction to become more closely aligned with each other.

10. The method according to claim 1 further comprising setting the masking noise direction by rotating the noise generator, or by selecting the noise generator from a set of noise generators.

11. The method according to claim 10 wherein the masking noise direction is set on the basis of a location of a receptor.

12. The method according to claim 1 wherein the RNA is oriented at a yaw angle, and the drive signal is based on the yaw angle.

13. The method according to claim 12 wherein the drive signal is enabled or changed on the basis of the yaw angle.

14. The method according to claim 1 wherein the drive signal is fed into the noise generator only for a specific operational envelope.

15. The method according to claim 1 wherein the horizontal projection of the masking direction has at least a component in the crosswind direction with respect to the rotor axis.

16. A wind turbine, comprising:

a noise generator;

a control system; and a rotor-nacelle-assembly (RNA), wherein the RNA comprises a nacelle and a rotor configured to rotate about a rotor axis with a horizontal projection, wherein the control system is configured to feed a drive signal into the noise generator so that the noise generator emits directional masking noise which at least partially masks tonal noise from the wind turbine and points in a masking direction with a horizontal projection, and the horizontal projection of the masking direction points away from the horizontal projection of the rotor axis.

17. The wind turbine according to claim 16 wherein the horizontal projection of the masking direction has at least a component in the crosswind direction with respect to the rotor axis.

18. The wind turbine according to claim 16 wherein the noise generator is rotatable about a yaw axis relative to the nacelle.

* * * * *